Patented Sept. 5, 1939

2,171,959

UNITED STATES PATENT OFFICE 2,171,959

CARBOXYLIC ACIDS OF THE CYCLO-PENTANO-POLYHYDRO - PHENANTHRENE SERIES AND A PROCESS OF PREPARING THEM

Max Bockmühl, Gustav Ehrhart and Heinrich Ruschig, Frankfort-on-the-Main-Hochst, Germany, assignors to Winthrop Chemical Company, Inc., New York, N. Y., a corporation of New York No Drawing. Application March 23, 1937, Serial No. 132,634. In Germany March 28, 1936

5 Claims. (Cl. 260—397)

The present invention relates to carboxylic acids of the cyclo-pentano-polyhydro-phenanthrene series and to a process of preparing them.

We have found that the carboxylic acids of the hydroaromatic series, important for the preparation of sterol derivatives having the character of sexual hormones, may be obtained in subjecting compounds of the following general formula: R.CO.CH₃ wherein R stands for a cyclo-pentano-polyhydro-penanthrene residue, to an oxidation process.

The acetyl radical may be oxidized to the corresponding carboxylic acid by hypohalites, chromic acid or other oxidizing agents. The process may be applied to saturated ketones or to such ketones of the hydroaromatic series as have double bonds corresponding with the character of several sexual hormones. If, for instances, acetoxy-pregnenolone is treated with hypoiodite the acetoxy-aetio-cholenyl carboxylic acid is obtained. It may be advantageous in this case to protect the double bonds temporarily, for instance by a bromination, and to remove the protecting radicals after the oxidation has occurred.

The carboxylic acids obtained according to the present process correspond with the following general formula:

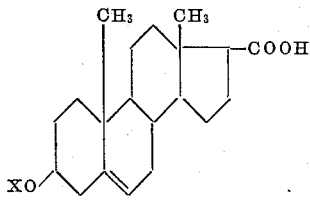

wherein X stands for hydrogen or for an acyl-radical readily split off by hydrolysis, for instance for the acetyl radical or the benzoyl radical. The compound wherein X stands for the acetyl radical is of special importance.

All these compounds are white, crystalline powders insoluble in water, readily soluble in alcohol and benzene and sparingly soluble in petroleum ether.

The carboxylic acids may be applied for the various purposes especially as intermediate products for further synthesis.

The following examples serve to illustrate the invention but they are not intended to limit it thereto:

(1) 1 gram of acetoxypregnenolone of the following formula:

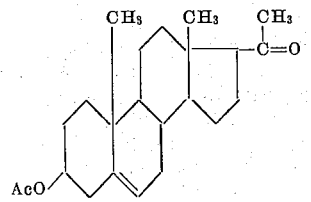

is allowed to stand for 24 hours at room temperature in 125 cc. of alcohol containing 0.7 gram of caustic soda and 2.1 grams of iodine. Already after a short time a strong iodoform odor may be perceived. The mass is then poured into water acidified with sulfuric acid, the colloid mixture is extracted with ether and the excess of iodine is removed by means of sodium bisulfite. By shaking with caustic soda solution the desired acid of the formula:

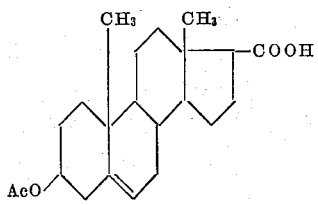

is separated from the ether solution. After acidifying the alkaline solution the above acid separates in flakes; it is redissolved in aqueous methanol. Its melting point is 201° C. to 202° C.

The de-acetylated acid which has the same solubility as the acetyl compound is formed by boiling the above acid in a reflux apparatus with an alcoholic caustic alkaline solution and a subsequent acidification with dilute mineral acids during which operation the acetyl group is split off.

(2) A solution of 0.8 gram iodine in 20 cc. of methanol and a solution of 0.6 gram of potassium hydroxide in 22 cc. of methanol of 45 per cent strength are introduced in the course of 2½ hours, while stirring, at room temperature into a solution of 0.25 gram of acetoxypregnenolone (melting point 146° C.) in 20 cc. of methanol, the iodine being at first always present in the solution in a great excess. The mass is now poured into water, the aqueous colloidal solution is acidified with sulfuric acid, the excess of iodine is removed by means of sodium bisulfite and the mixture is extracted with ether. The 3-acetoxy-aetio-cholenic acid is extracted from the ethereal solution by means of caustic soda solution wherein it is soluble for the greater part. After acidification a very pure acid separates in flakes. It is purified by recrystallization from aqueous acetone; the yield amounts to 0.1 gram and the melting point lies at 197° C. to 201° C.

(3) To a solution of 1 gram of acetoxypregnenolone in 40 cc. of methanol there are added drop by drop at room temperature, while stirring, (1) a solution of 2.4 grams of potassium hydroxide in 20 cc. of water and 20 cc. of methanol during 60 minutes and (2) a solution of 3.2 grams of iodine in 40 cc. of methanol during 30 minutes. The mass is then poured into water, the solution is acidified, the separated iodine is removed by means of sodium disulfite and the colloidal mixture from which the desired acid separates in flakes is extracted with ether. The acid is extracted from the ethereal solution by means of caustic soda solution. The yield amounts to 0.75 gram of a well crystallized product which may be further treated immediately.

(4) To a solution of 0.3 gram of 3-acetoxy-pregnanolone (melting point 93° C.) in 20 cc. of methanol there are added at room temperature, while stirring, (1) a solution of 0.8 gram of iodine in 20 cc. of methanol during 60 minutes and (2) a solution of 0.6 gram of potassium hydroxide in 20 cc. of methanol of 45 per cent strength during 2 hours. The working up is carried out as described in the foregoing examples. The yield of the corresponding aetiocholanic acid amounts to 0.2 gram. This acid decomposes at 147° C. (not exact).

We claim:

1. The process which comprises causing an hypohalite to act upon a compound of the following general formula:

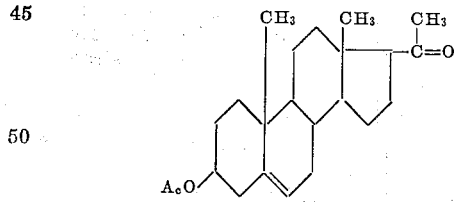

wherein Ac stands for an acyl radical readily split off by hydrolysis.

2. The process which comprises causing an hypoiodite to act upon a compound of the following general formula:

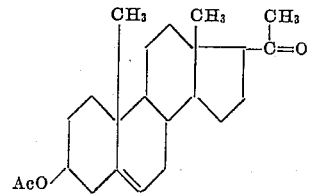

wherein Ac stands for an acyl radical readily split off by hydrolysis.

3. The process which comprises causing an hypoiodite to act upon the compound of the following formula:

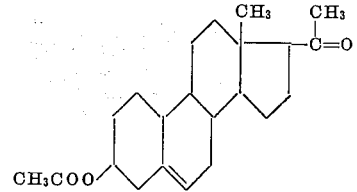

4. The compounds of the following general formula:

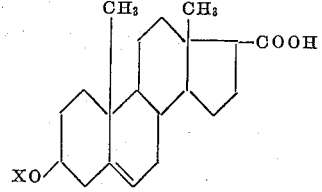

wherein X stands for a member of the group consisting of hydrogen and the acyl radicals readily split off by hydrolysis, said compounds being white, crystalline powders insoluble in water, readily soluble in alcohol and benzene and sparingly soluble in petroleum ether.

5. The compound of the following formula:

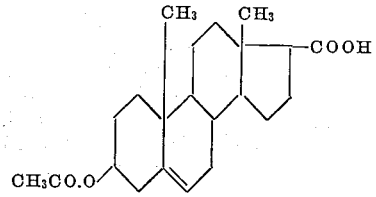

said compound being a white, crystalline powder insoluble in water, readily soluble in alcohol and benzene and sparingly soluble in petroleum ether.

MAX BOCKMÜHL.
GUSTAV EHRHART.
HEINRICH RUSCHIG.